US008289188B2

(12) United States Patent
Ueno et al.

(10) Patent No.: US 8,289,188 B2
(45) Date of Patent: Oct. 16, 2012

(54) ROAD TRAFFIC INFORMATION PROVIDING SYSTEM, ROAD TRAFFIC INFORMATION PROVIDING DEVICE, ROAD TRAFFIC INFORMATION PROVIDING METHOD, AND PROGRAM

(75) Inventors: Masahiro Ueno, Suginami-ku (JP); Hideyuki Nagatomo, Kawasaki (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 301 days.

(21) Appl. No.: 12/808,420

(22) PCT Filed: Dec. 19, 2008

(86) PCT No.: PCT/JP2008/073152
§ 371 (c)(1),
(2), (4) Date: Jun. 16, 2010

(87) PCT Pub. No.: WO2009/081847
PCT Pub. Date: Jul. 2, 2009

(65) Prior Publication Data
US 2011/0148659 A1 Jun. 23, 2011

(30) Foreign Application Priority Data
Dec. 21, 2007 (JP) ................................ 2007-331092

(51) Int. Cl.
*G08G 1/0967* (2006.01)
(52) U.S. Cl. ..................... 340/905; 340/995.13; 701/400
(58) Field of Classification Search .................. 340/905, 340/995.1, 995.12, 995.13, 996, 901; 701/201, 701/400, 428, 441
See application file for complete search history.

(56) References Cited

U.S. PATENT DOCUMENTS 5,508,917 A * 4/1996 Siegle et al. .................. 701/428
(Continued)

FOREIGN PATENT DOCUMENTS

EP 1 229 508 A 8/2002
(Continued)

OTHER PUBLICATIONS

Notification of Transmittal of Translation of the International Preliminary Report on Patentability (Application No. PCT/JP2008/073152) dated Sep. 2, 2010.
(Continued)

*Primary Examiner* — Toan N Pham
(74) *Attorney, Agent, or Firm* — Eric J. Robinson; Robinson Intellectual Property Law Office, P.C.

(57) ABSTRACT

An utterance type road traffic information providing device (system) provided with a roadside apparatus (100) set on a road where a vehicle travels, at a parking lot or a place adjacent to the parking lot for transmitting alarm information by wireless communication, an utterance type vehicle-mounted device (200) mounted on a vehicle for receiving the alarm information from the roadside apparatus by wireless communication and outputting the alarm information, a administration server (300) that exchanges various information with the roadside apparatus (100). The utterance type vehicle-mounted device (200) is comprised of a predetermined operation unit and a control unit. The control unit cancels a part or all of the utterance voice output of the alarm information supplied from the roadside apparatus (100) in accordance with a predetermined operation of the operation unit. An output of the same alarm information or alarm information irrelevant to its own vehicle is prevented.

7 Claims, 9 Drawing Sheets

U.S. PATENT DOCUMENTS

| | | | | |
|---|---|---|---|---|
| 5,819,198 A | * | 10/1998 | Peretz | 701/117 |
| 5,839,086 A | * | 11/1998 | Hirano | 701/420 |
| 6,466,862 B1 | * | 10/2002 | DeKock et al. | 701/117 |
| 6,943,702 B2 | * | 9/2005 | Kato | 340/988 |
| 7,427,928 B2 | * | 9/2008 | Crocker et al. | 340/902 |
| 8,165,748 B2 | * | 4/2012 | Goto et al. | 701/36 |

FOREIGN PATENT DOCUMENTS

| | | |
|---|---|---|
| JP | 08-086662 | 4/1996 |
| JP | 10-104005 | 4/1998 |
| JP | 2002-202741 | 7/2002 |
| JP | 2002-236029 | 8/2002 |
| JP | 2007-326493 | 12/2007 |
| WO | WO 98/06080 | 2/1998 |

OTHER PUBLICATIONS

International Search Report for Application Serial No. PCT/JP2008/073152.

Supplementary European Search Report (Application No. 08865797.8) dated Jun. 13, 2012.

Written Notification of Reason for Refusal (Application No. 2007-331092) dated Jul. 3, 2012.

* cited by examiner

FIG. 9

| TRAFFIC INFORMATION TYPE |
| --- |
| ROADSIDE APPARATUS ID |
| ROAD TYPE |
| LANE TYPE (INBOUND/OUTBOUND LANE) |
| LANE TYPE (LOOP LINE) |
| DIRECTION INFORMATION |
| ROADSIDE NUMBER |
| TEXT INFORMATION |
| STATIONARY IMAGE INFORMATION |
| AUDIO INFORMATION |

ROAD TRAFFIC INFORMATION PROVIDING SYSTEM, ROAD TRAFFIC INFORMATION PROVIDING DEVICE, ROAD TRAFFIC INFORMATION PROVIDING METHOD, AND PROGRAM

TECHNICAL FIELD

The present invention relates to a road traffic information providing system, a road traffic information providing device, a road traffic information providing method, and a program

BACKGROUND ART

Accurately reporting the traffic condition by providing alarm information (such as road traffic information) with appropriate content at appropriate time is useful for the driver to comfortably and safely drive the vehicle. Congestion status of road, road regulation status due to an occurrence of accident or implementation of construction, road surface condition, and weather condition (for example, temperature and visibility) are typical useful road traffic information.

One of the road traffic information providing systems recently being developed is a road traffic information providing system using DSRC (Dedicated Short Range Communications) for providing road traffic information to a driver and the like of a vehicle mounted with an ETC vehicle-mounted device (for example, see Patent Document 1).

DISCLOSURE OF THE INVENTION

Problems to be Solved by the Invention

By the way, in such a road traffic information providing system, there is a problem that every time the ETC vehicle-mounted device enters the communication range of a roadside apparatus, i.e. every time the vehicle passes near a new roadside apparatus, the same information as the alarm information once outputted in the past is repeatedly outputted to the user (driver) in some cases, which is burdensome.

The present invention has been made in view of the problem, and an object of the present invention is to provide a road traffic information providing system, a road traffic information providing device, a road traffic information providing method, and a program capable of preventing alarming (outputting) of the same alarm information (unnecessary information) and alarm information not related to the vehicle.

Means for Solving the Problems

To attain the object, a road traffic information providing device of the present invention is an utterance type road traffic information providing device that receives alarm information from a roadside apparatus installed on or near a road that a vehicle travels or a parking lot through wireless communication and that outputs the alarm information, the utterance type road traffic information providing device comprising: a predetermined operation unit; and a control unit, wherein the control unit controls not to output all or part of alarm information supplied by the roadside apparatus in utterance by speech based on a predetermined operation of the operation unit.

According to a second aspect of the present invention, a road traffic information providing device of the present invention is an utterance type road traffic information providing device that receives alarm information from a roadside apparatus installed on or near a road that a vehicle travels or a parking lot through wireless communication and that outputs the alarm information, the road traffic information providing device comprising: a communication unit that receives the alarm information from the roadside apparatus at timing at which a link is set up with the roadside apparatus; a storage unit that temporarily stores the alarm information; an audio processing unit that converts the alarm information into audio information to output the audio information in utterance; an operation unit that controls the utterance output as needed; and alarm information transfer means for reading out the alarm information stored in the storage unit according to the priority to transfer the alarm information to the audio processing unit if the operation of the operation unit is not performed and for transferring an utterance output stop signal and the alarm information to the audio processing unit under a predetermined condition according to the operation content if the operation of the operation unit is performed.

Furthermore, in the road traffic information providing device of the present invention, when a predetermined operation is performed by the operation unit, the alarm information transfer means executes a process of transferring the utterance output stop signal to the audio processing unit and not transferring alarm information excluding disaster information as one of the alarm information stored in the storage unit to the audio processing unit for a predetermined time or for a predetermined number of pieces.

Furthermore, in the road traffic information providing device of the present invention, if a predetermined operation is performed by the operation unit, the alarm information transfer means executes a process of transferring the utterance output stop signal to the audio processing unit, further interrupting transferring the alarm information being transferred and stored in the storage unit, skipping the transfer position of the interrupted alarm information to a next punctuation mark of TTS or to next alarm information, and then resuming transferring the alarm information to the audio processing unit from the skipped transfer position.

Furthermore, in the road traffic information providing device of the present invention, if a predetermined operation is performed by the operation unit when the alarm information transfer means transfers high-priority alarm information, the alarm information transfer means executes a process of transferring the utterance output stop signal to the audio processing unit and not transferring low-priority general traffic information as one of the alarm information stored in the storage unit subsequent to the high-priority, alarm information.

The road traffic information providing device of the present invention further comprises: an ID storage unit that stores an ID of the roadside apparatus; and ID registration means for registering the ID of a predetermined roadside apparatus to the ID storage unit, wherein if a predetermined operation is performed by the operation unit when alarm information received from the roadside apparatus and not related to the vehicle is outputted in utterance, the ID registration means executes a process of registering the ID of the roadside apparatus to the ID storage unit, and the alarm information transfer means executes a process of not transferring, to the audio processing unit, alarm information received from the roadside apparatus with the ID registered in the ID storage unit after the registration in the ID storage unit.

According to a third aspect of the present invention, a road traffic information providing system of the present invention comprises: a roadside apparatus that is installed on or near a road that a vehicle travels or a parking lot and that transmits alarm information through wireless communication; a vehicle-mounted device that receives the alarm information from the roadside apparatus through the wireless communication and that is mounted on the vehicle that outputs the alarm information; and an administration server that communicates various information with the roadside apparatus, wherein the vehicle-mounted device comprises: a predetermined operation unit; and a control unit, and the control unit controls not to output all or part of the alarm information supplied by the roadside apparatus in utterance by speech based on a predetermined operation of the operation unit.

According to a fourth aspect of the present invention, a road traffic information providing method of the present invention is a road traffic information providing method of receiving, by a road traffic information providing device, alarm information from a roadside apparatus installed on or near a road that a vehicle travels or a parking lot through wireless communication and of outputting the alarm information, the road traffic information providing method comprising: a reception step of receiving the alarm information from the roadside apparatus at timing at which a link is set up between the road traffic information providing device and the roadside apparatus; a storage step of temporarily storing the alarm information; an audio processing step of converting the alarm information into audio information to output the audio information in utterance; an operation step of controlling the utterance output as needed; and an alarm information transfer step of reading out the stored alarm information according to the priority of the alarm information and outputting the alarm information in utterance if the operation is not performed and of outputting the alarm information in utterance under a predetermined condition according to the operation content if the operation is performed.

According to a fifth aspect of the present invention, a road traffic information providing program of the present invention causes a computer to function as: a communication unit that receives alarm information from a roadside apparatus at timing at which a link is set up between a road traffic information providing device and the roadside apparatus; a storage unit that temporarily stores the alarm information; an audio processing unit that converts the alarm information into audio information to output the audio information in utterance; an operation unit that controls the utterance output as needed; and alarm information transfer means for reading out the alarm information stored in the storage unit according to the priority of the alarm information to output the alarm information to the audio processing unit if the operation of the operation unit is not performed and for transmitting an utterance output stop signal to the audio processing unit under a predetermined condition according to the operation content and further transferring the alarm information to the audio processing unit if the operation of the operation unit is performed.

Effect of the Invention

According to the present invention, alarming (outputting) of the same alarm information (unnecessary information) and alarm information not related to the vehicle (such as information for an outbound lane received when the vehicle travels in an inbound lane) can be prevented.

BRIEF DESCRIPTION OF THE DRAWINGS

FIG. 9 is a diagram showing an example of information (data) transmitted from the roadside apparatus to the utterance type vehicle-mounted vehicle.

DESCRIPTION OF SYMBOLS

Figure 1:
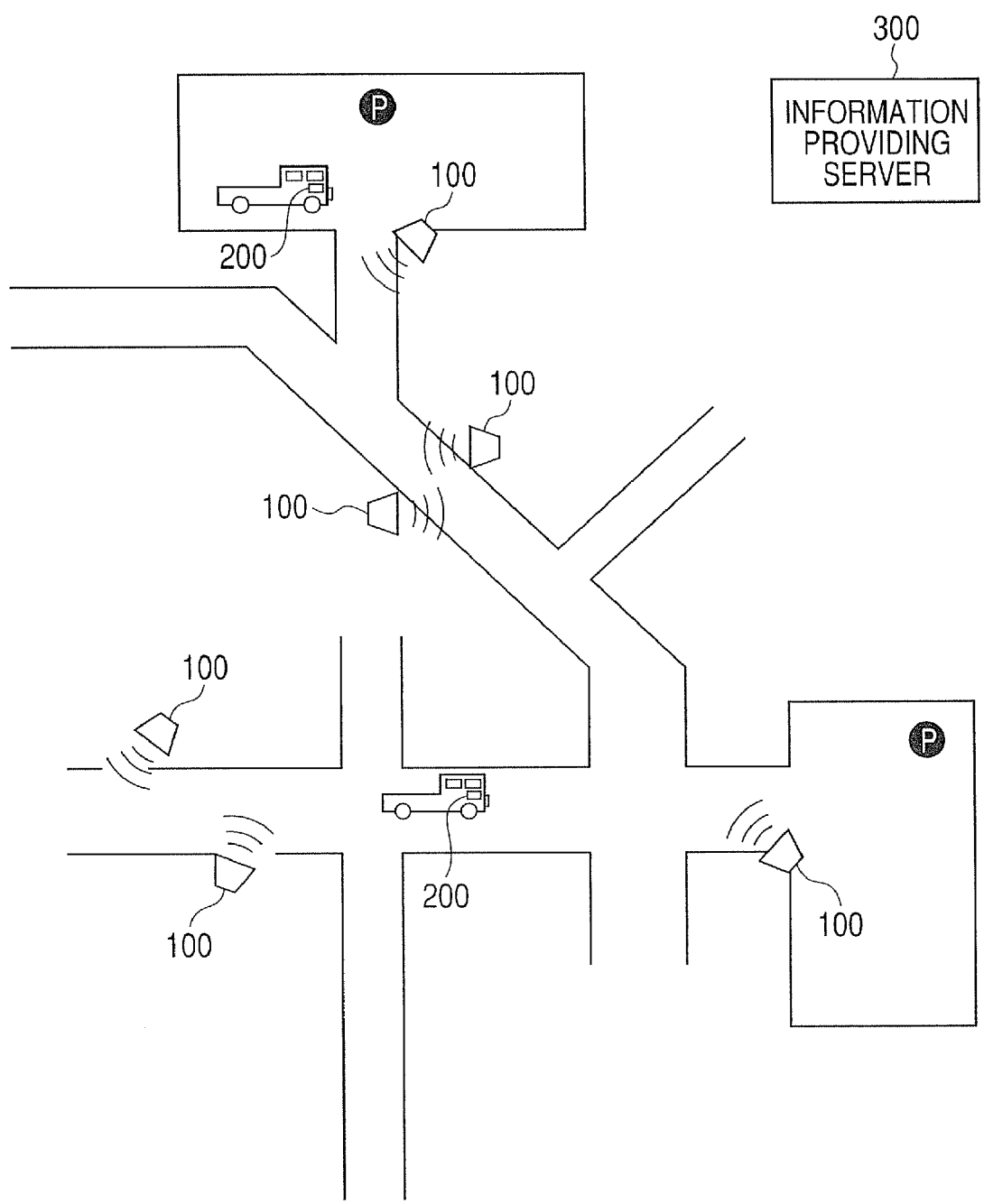
FIG. 1 is a diagram for explaining an overall configuration of a road traffic information providing system according to an embodiment of the present invention.

100 roadside apparatus
101 wireless communication unit for vehicle-mounted device
102 communication control unit for server
103 storage device
104 control unit
200 utterance type vehicle-mounted device (utterance-type road traffic information providing device)
201 communication unit
201*a* DSRC module
202 audio processing unit
204 operation unit
206 storage unit (vehicle-mounted device ID storage means)
207 control unit
222 loudspeaker
300 information providing server (administration server)
303 general network communication control unit
304 communication control unit for roadside apparatus
305 storage device
306 control unit
400 main body of utterance type vehicle device
401 cancellation button
402 SKIP button
NW1 general communication network
NW2 ITS communication network

BEST MODES FOR CARRYING OUT THE INVENTION

Hereinafter, an utterance type road traffic information providing system according to an embodiment of the present invention will be described, taking an ITS (Intelligent Transport Systems) system as an example. In the present embodiment, although an utterance type vehicle-mounted device (apparatus that cannot acquire position information data and direction data of the vehicle) not connected to a navigation apparatus (including a portable-type simple navigation apparatus) will be described as an example, it is obvious that the present embodiment can be also applied to an utterance type vehicle-mounted device connected to a portable-type simple navigation apparatus and the like, an ITS vehicle-mounted device connected to the navigation apparatus, and the like.

As shown in FIG. 1, the ITS system comprises roadside apparatuses 100 arranged near locations, such as a road and a parking lot where a vehicle travels, an utterance type vehicle-mounted device 200 as an utterance-type road traffic information providing device mounted on the vehicle, and an information providing server (administration server) 300 that transmits/receives information to and from the roadside apparatuses 100. The roadside apparatuses 100 may be installed specially for the utterance type vehicle-mounted device 200 or may also be installed both for the ITS vehicle-mounted device and the utterance type vehicle-mounted device 200 to also serve as navigation apparatuses.

The utterance type vehicle-mounted device 200 is an utterance-type road traffic information providing device that performs communication at timing at which a link is set up with the roadside apparatus 100 (when in the communication range of the roadside apparatus 100) to provide road traffic information (alarm information) or the like to the passenger of the vehicle and that transmits an utterance type vehicle-mounted device ID (also simply called vehicle-mounted device ID: details will be described below), which is a type of vehicle ID, and the like to the roadside apparatus 100. The information providing server 300 generates various information and supplies the information to the roadside apparatuses 100.

Each roadside apparatus 100 shown in FIG. 1 is constituted by a so-called radio wave beacon, a light beacon, and the like, is arranged near the road, at a parking lot, or the like, transmits (downlinks) alarm information to the utterance type vehicle-mounted device 200 of the vehicle passing nearby (within the communication range of the roadside apparatus 100) by the DSRC (Dedicated Short Range Communication) system in the traffic information distribution or the like, receives transmission data (uplink data: such as vehicle-mounted device ID) from the utterance type vehicle-mounted device 200, and supplies the data to the information providing server 300.

Each roadside apparatus 100 wirelessly transmits alarm information (intermediate language for TTS: described in detail below), which is data transmitted from the information providing server 300 and which is to be transmitted to the utterance type vehicle-mounted device 200, to the utterance type vehicle-mounted device 200.

Figure 2:
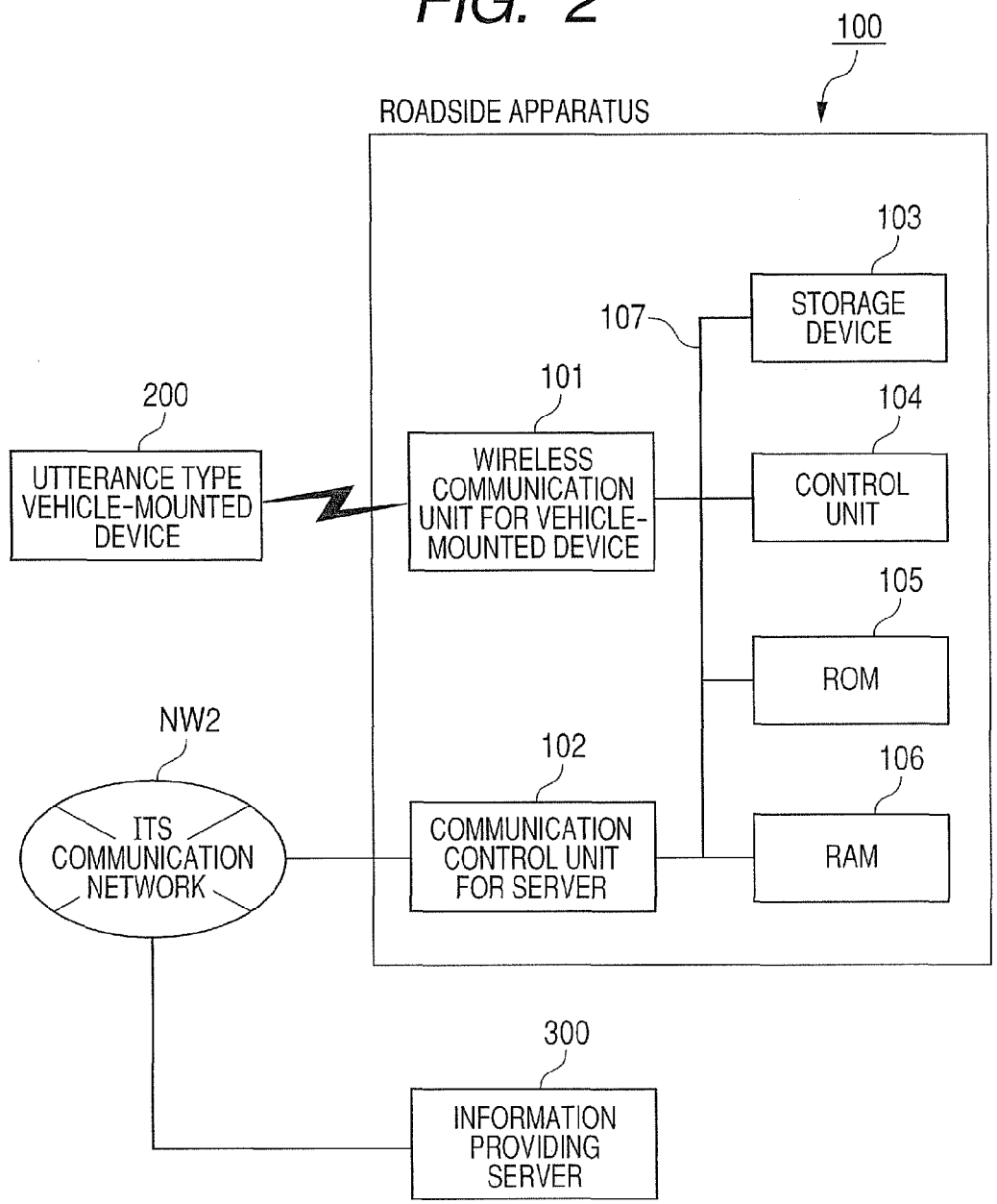
FIG. 2 is a diagram showing an example of configuration of a roadside apparatus used in the road traffic information providing system shown in FIG. 1.

To attain such functions, as shown in FIG. 2, the roadside apparatus 100 comprises a wireless communication unit for vehicle-mounted device 101 as transmission/reception means for the vehicle-mounted device, a communication control unit for server 102 as communication control means for server (including transmission/reception function), a storage device 103, a control unit 104, a ROM (Read Only Memory) 105, a RAM (Random Access Memory) 106, and a system bus 107.

The wireless communication unit for vehicle-mounted device 101 transfers information to and from the utterance type vehicle-mounted device 200 installed on the vehicle passing nearby (within the communication range of the roadside apparatus 100) by one or a plurality of wireless signals, such as a radio wave signal and a light signal. For example, when the information providing server 300 outputs alarm information, the wireless communication unit for vehicle-mounted device 101 transmits the alarm information (including roadside apparatus ID) to the utterance type vehicle-mounted device 200. Furthermore, the wireless communication unit for vehicle-mounted device 101 receives information, such as vehicle-mounted device ID, transmitted from the utterance type vehicle-mounted device 200.

The vehicle-mounted device ID is an ID set for each vehicle-mounted device, and a certification organization registers the ID in association with the vehicle. Thus, the vehicle-mounted device ID is a type of ID for identifying the vehicle. Therefore, personal information can be acquired from the vehicle-mounted device ID. As described, the roadside apparatus 200 also has a predetermined apparatus number (ID), and when the roadside apparatus 200 downlinks information (such as alarm information) to the vehicle-mounted device, the vehicle-mounted device is notified of the roadside apparatus ID at the same time.

The communication control unit for server 102 is connected to the information providing server 300 through an ITS communication network NW2 and controls to receive alarm information, such as traffic information, transmitted from the information providing server 300 and reserve the alarm information in the storage device 103. The communication control unit for server 102 also controls to provide the traffic information, the vehicle-mounted device ID, and the like acquired by the roadside apparatus 100 to the information providing server 300.

The storage device 103 stores traffic information received from the information providing server 300 and traffic information, vehicle-mounted device ID, and the like specific to the roadside apparatus 100. The storage device 103 also stores information uplinked from the utterance type vehicle-mounted device 200.

The control unit 104 is constituted by a processor and the like and controls the operation of the entire roadside apparatus 100. Particularly, the control unit 104 controls to transmit the traffic information stored in the storage device 103 from the wireless communication unit for vehicle-mounted device 101 and controls to store the information (such as vehicle-mounted device ID) acquired from the utterance type vehicle-mounted device 200 through the wireless communication unit for vehicle-mounted device 101 in the storage device 103.

The control unit 104 also controls to transmit the traffic information, the information stored in the storage device 103, and the like stored in the storage device 103 and acquired by the roadside apparatus 100 to the information providing server 300 through the communication control unit for server 102 and the ITS communication network NW2 and to store the information (such as traffic information) acquired from the information providing server 300 through the communication control unit for server 102 in the storage device 103.

The control unit 104 also acquires the information (such as vehicle-mounted device ID) uplinked from the utterance type vehicle-mounted device 200 through the wireless communication unit for vehicle-mounted device 101 and stores the information in the storage device 103.

The ROM 105 stores an operating system (OS), an operation program, and various data necessary for the operational control of the entire roadside apparatus 100. The RAM 106 functions as a work area of the control unit 104.

The system bus 107 is a transmission path for transferring commands and data between the components.

Figure 3:
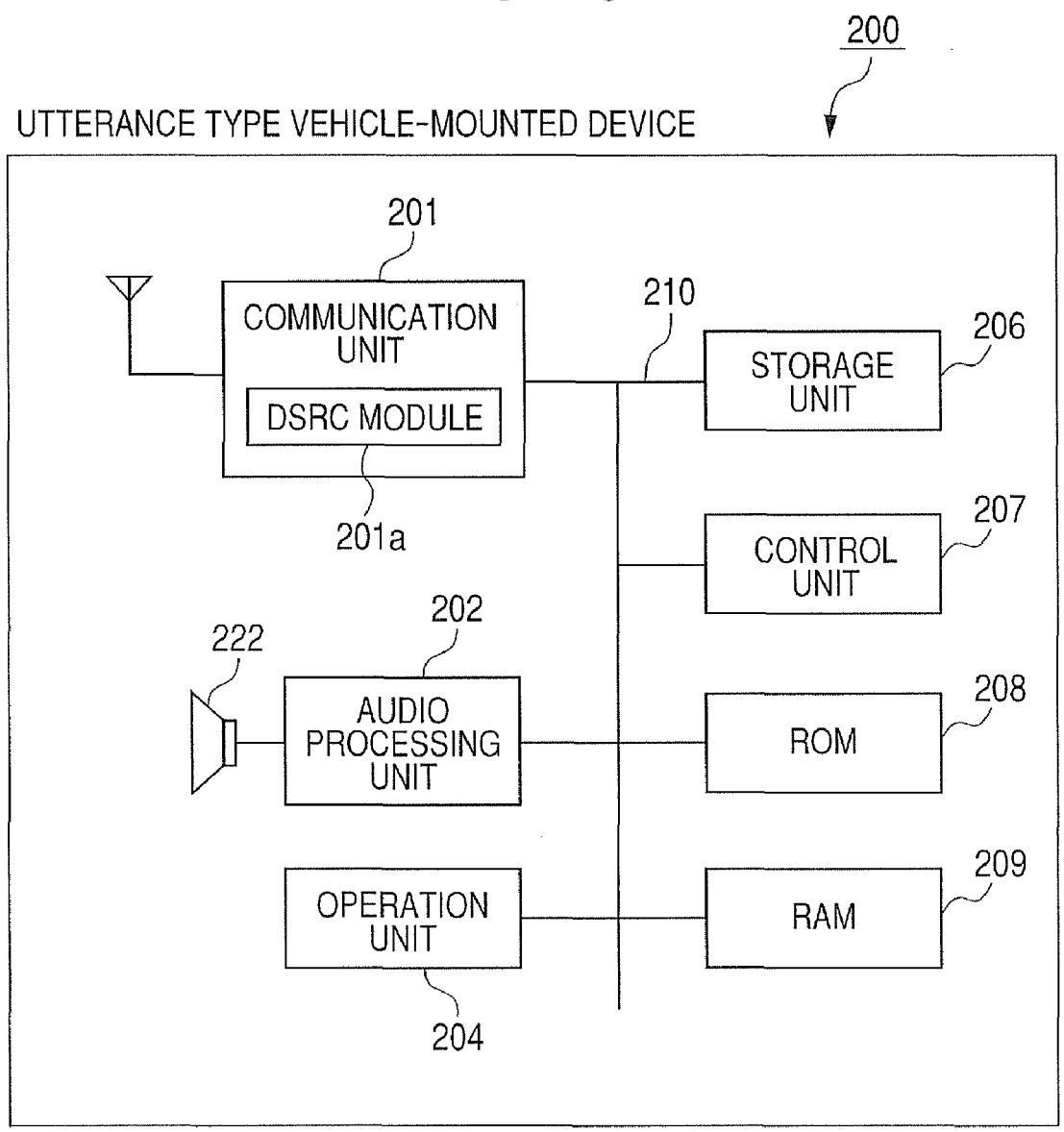
FIG. 3 is a diagram for explaining a configuration of an utterance type vehicle-mounted device used in the road traffic information providing system shown in FIG. 1.

The utterance type vehicle-mounted device 200 shown in FIG. 3 is installed on the vehicle and has a function of reproducing the alarm information (such as traffic information: intermediate language for TTS) transmitted from the roadside apparatus 100 for alarming. The utterance type vehicle-mounted device 200 also notifies (uplinks) the roadside apparatus 100 of the vehicle-mounted device ID, and the like.

As shown in FIG. 3, the utterance type vehicle-mounted device 200 comprises a communication unit 201, an audio processing unit 202, an operation unit 204, a storage unit 206, a control unit 207, a ROM 208, a RAM 209, and a system bus 210.

The communication unit 201 at least includes a DSRC module 201a.

The DSRC module 201a communicates with the roadside apparatus 100 by the DSRC system and receives the alarm information supplied (downlinked) from the roadside apparatus 100.

The audio processing unit 202 converts the alarm information made of a TTS (Text To Speech) intermediate language (text data for speech synthesis: including information of intonation and the like) inputted by the storage unit 206 through the control unit 207 into an analog audio signal and outputs the signal to the loudspeaker 222. This allows the user to listen to the alarm information (TTS intermediate language) acquired from the roadside apparatus 100 as speech data.

When an utterance output stop signal (such as a reset signal) is received from the control unit 207, the audio processing unit 202 returns a control unit, a memory, and the like inside the apparatus to initial states. This allows the control unit 207 to instantaneously stop the utterance output from the audio processing unit 202 without generating a time lag. Other than the loudspeaker 222 included in the utterance type vehicle-mounted device 200, the alarm information (speech data) may be outputted from the audio system mounted on the vehicle. The audio processing unit 206 may also be arranged outside the utterance type vehicle-mounted device 200.

Figure 4:
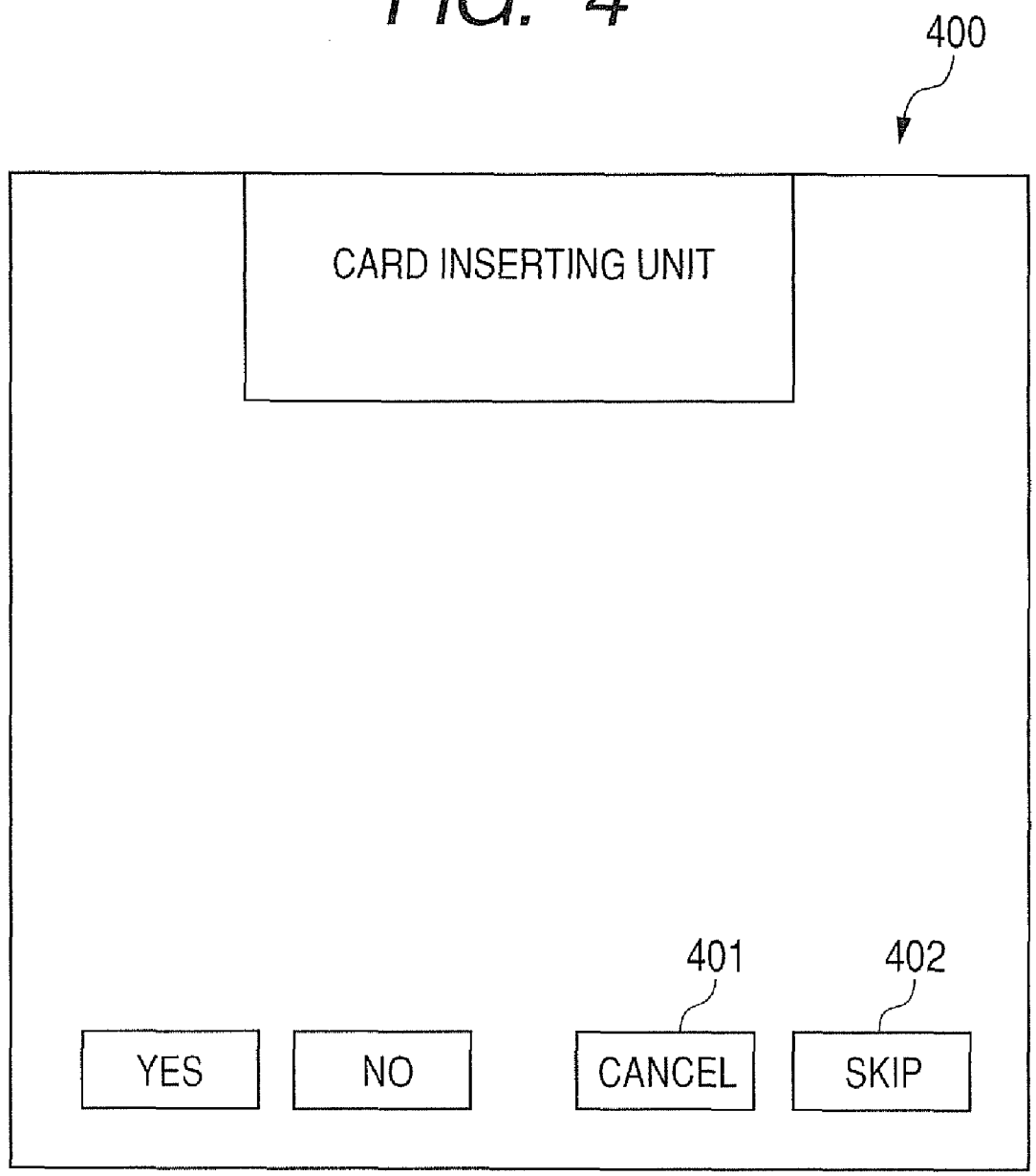
FIG. 4 is a diagram showing an example of an overview of the utterance type vehicle-mounted device shown in FIG. 3.

As shown in FIG. 4, the operation unit 204 is constituted by, for example, a cancellation button 401, and a SKIP button 402 arranged on a main body 400 of the utterance type vehicle-mounted device 200. The operation unit 204 generates an instruction input signal based on instruction input by the user and inputs the signal to the control unit 207. When the utterance type vehicle-mounted device 200 and a monitor (such as a navigation apparatus) are connected, if, for example, the cancellation operation of the utterance output cannot be performed by pushing down the cancellation button 401, the fact may be displayed on the monitor.

The storage unit 206 that is a storage unit of the alarm information supplied (downlinked) from the roadside apparatus 100 and that is an ID storage unit storing a predetermined ID of the roadside apparatus 100 includes a hard disk drive (HDD) and stores various setting information, and the like.

The storage unit 206 also stores in advance the vehicle-mounted device ID (utterance type vehicle-mounted device ID) for identifying the vehicle. The vehicle-mounted device ID is an ID for identifying the vehicle put on the header part of packets transmitted/received for establishing a link between the roadside apparatus 100 and the utterance type vehicle-mounted device 200, packets in the case of the utterance type vehicle-mounted device 200 uplinking the data (such as vehicle-mounted device ID) to the roadside apparatus 100, packets in the case of the roadside apparatus 100 downlinking the data (such as alarm information) to the utterance type vehicle-mounted device 200, or the like.

The control unit 207 is constituted by a CPU (Central Processing Unit) and controls the operation of the entire utterance type vehicle-mounted device 200.

For example, at timing at which a link is set up between the utterance type vehicle-mounted device 200 and the roadside apparatus 100, i.e. when the vehicle-mounted device 200 is positioned in the communication area of the roadside apparatus 100, the control unit 207 as alarm information transfer means controls the communication unit 201 (DSRC module 201a) to read out the vehicle-mounted device ID and the like stored in the storage unit 206 and transmits (uplinks) the vehicle-mounted device ID and the like to the roadside apparatus 100.

Furthermore, when a link is set up between the communication unit 201 (DSRC module 201a) and the wireless communication unit for vehicle-mounted device 101 of the roadside apparatus 100, the control unit 207 receives (downlinks) the alarm information including roadside apparatus ID) from the roadside apparatus 100 through the DSRC module 201a, stores the information in the storage unit 206, reads out the alarm information stored in the storage unit 206 in a predetermined procedure based on an instruction input signal from the operation unit 204, and transfers the information to the audio processing unit 202. Furthermore, the control unit 207 can transmit an utterance output stop signal (such as a reset signal) to the audio processing unit 202 to instantaneously stop the utterance output of the audio processing unit 202 (without generating a time lag). The alarm information read out from the storage unit 206 or alarm information determined to be unnecessary may be deleted from the storage unit 206. The control unit 207 may comprise a co-processor and the like.

Furthermore, when a link is set up between the communication unit 201 communication unit 201 (DSRC module 201a) and the wireless communication unit for vehicle-mounted device 101 of the roadside apparatus 100, the control unit 207 reads out the vehicle-mounted device ID and the like stored in the storage unit 206 and transmits (uplinks) the vehicle-mounted device ID and the like to the wireless communication unit for vehicle-mounted device 101 of the roadside apparatus 100 through the communication unit 201 (DSRC module 201a).

The ROM 208 records a program of an operating system (OS), an operation program, and various data necessary for the operational control of the entire utterance type vehicle-mounted device 200.

The RAM 209 is for temporary storage of the data and programs and temporarily holds the data (alarm information) and the like acquired by the communication unit 201. The control unit 207 also uses the RAM 209 as a work memory.

The system bus 210 is a transmission path for interconnecting the components and transferring commands and data.

The information providing server 300 is an apparatus that generates and distributes traffic information, which is the same or different in each of the plurality of roadside apparatuses 100, and that receives the vehicle-mounted device ID and the like transmitted from the roadside apparatus 100.

Figure 5:
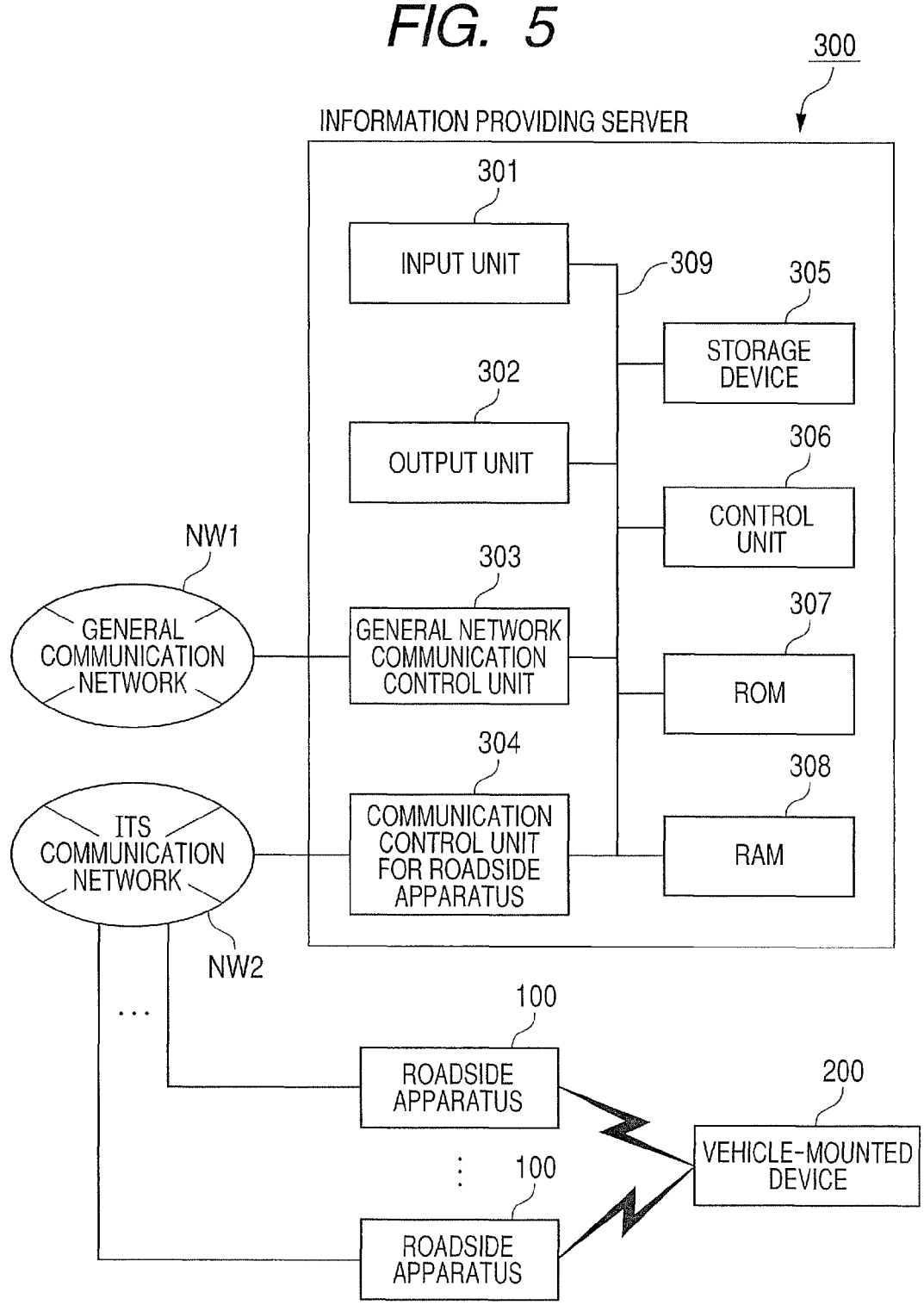
FIG. 5 is a diagram for explaining a configuration of an information providing server (administration server) used in the road traffic information providing system shown in FIG. 1.

As shown in FIG. 5, the information providing server 300 comprises an input unit 301, an output unit 302, a general network communication control unit 303, a communication control unit for roadside apparatus 304, a storage device 305, a control unit 306, a ROM 307, a RAM 308, and a system bus 309.

The input unit 301 comprises one or a plurality of keyboard, mouse, input interface, and the like and inputs various data and instructions.

The output unit 302 is constituted by a display unit and the like and displays data, messages, and the like.

The general network communication control unit 303 communicates with an external apparatus through the general communication network NW1, such as a telephone line and the Internet, to acquire various information. The information providing server 300 may be divided into, for example, a regional server and a central server. The regional server edits the road conditions, such as peak detour, near tunnel, near curve, point of sudden weather change in mountain area, and road surface freezing point, at the sites near the trouble occurrence points to set alarm information and provides the alarm information to the vehicle (vehicle-mounted device).

The communication control unit for roadside apparatus 304 is connected to a plurality of roadside apparatuses 100 through the ITS communication network NW2, transmits the traffic information to the roadside apparatuses 100, and receives the vehicle-mounted device ID and the like transmitted from the roadside apparatus 100.

The storage device 305 comprises storage means, such as a hard disk device, and stores various traffic information, the vehicle-mounted device IDs obtained by roadside apparatuses 100 through the communication with the utterance type vehicle-mounted device 200, and the like. The storage device 305 also stores position information (latitude, longitude, and the like), addresses, and the like of the roadside apparatuses 100 as well as nearby geographic information.

The control unit 306 is constituted by a processor and the like and controls the operation of the entire information providing server 300. The control unit 306 also creates information to be distributed from the roadside apparatus 100 for each roadside apparatus 100 based on various information stored in the storage device 305 and supplies the information to each roadside apparatus 100 through the communication control unit for roadside apparatus 304 and the ITS communication network NW2.

The ROM 307 stores an operating system (OS), an operation program, and various data necessary for the operational control of the entire information providing server 300. The RAM 308 functions as a work area of the control unit 306. The system bus 309 is a transmission path for transferring commands and data between the components.

Figure 8:
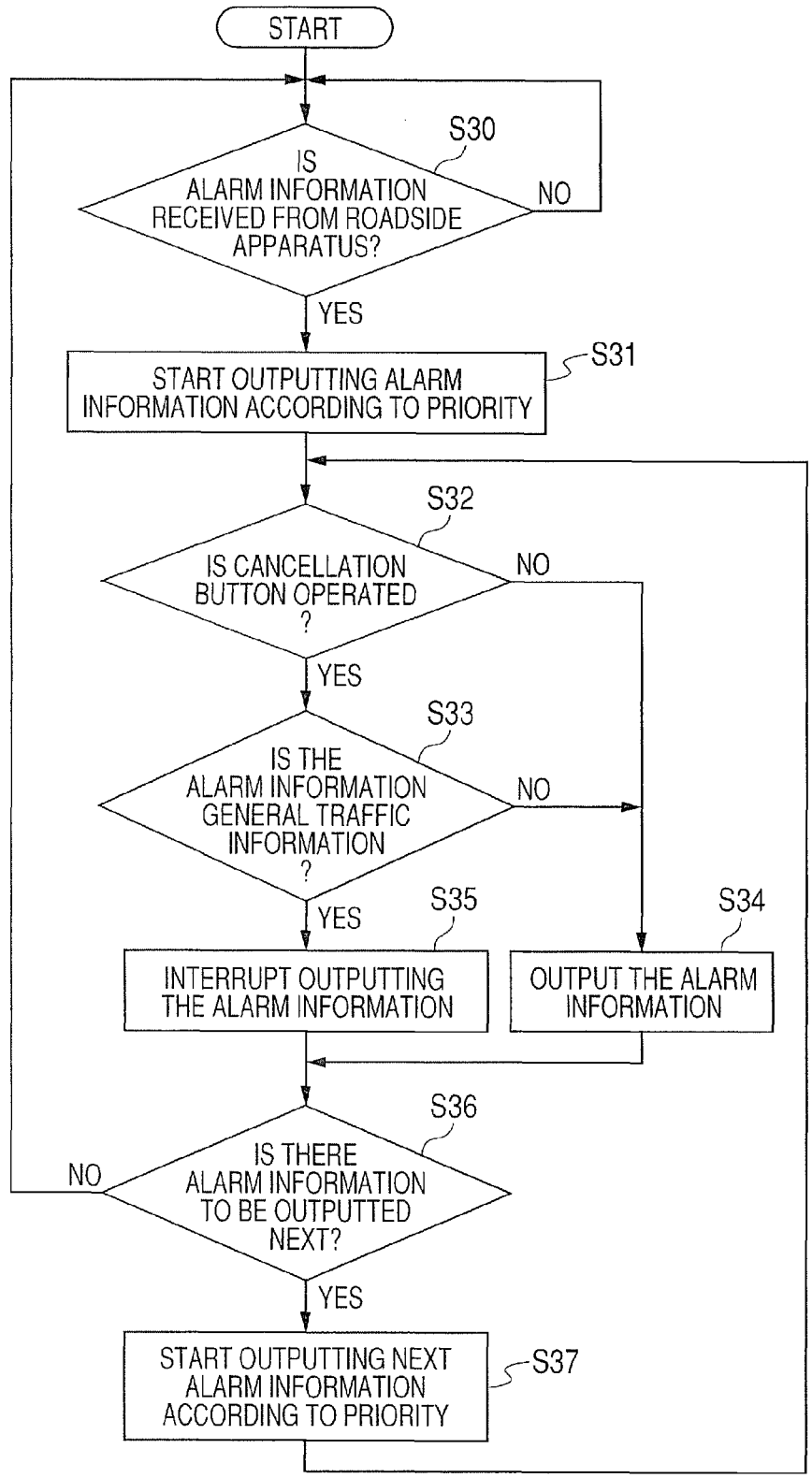
FIG. 8 shows another example of a processing procedure executed by the road traffic information providing system of FIG. 1 and is a flow chart for explaining an example of a processing procedure (operation) in which if the alarm information is disaster information or safe driving support information when the cancellation button of the utterance type vehicle-mounted device is operated, the alarm information is outputted in utterance without accepting the cancellation button, and if the alarm information is general traffic information, the utterance is stopped.

FIG. 8 shows an example of information (data) transmitted from the roadside apparatus 100 to the utterance type vehicle-mounted device 200.

Next, a basic operation in the utterance-type road traffic information providing device (system) according to the present embodiment will be described. In the present embodiment, to simplify the description, three examples of the alarm information are described: (1) general traffic information such as highway radio; (2) disaster information about an earthquake and the like; and (3) safe driving support information about merge warning information, a sudden accident, and the like. Although the priority of alarming is in the order of disaster information→safe driving support information→general traffic information in the description, the order is not limited to this.

Figure 6:
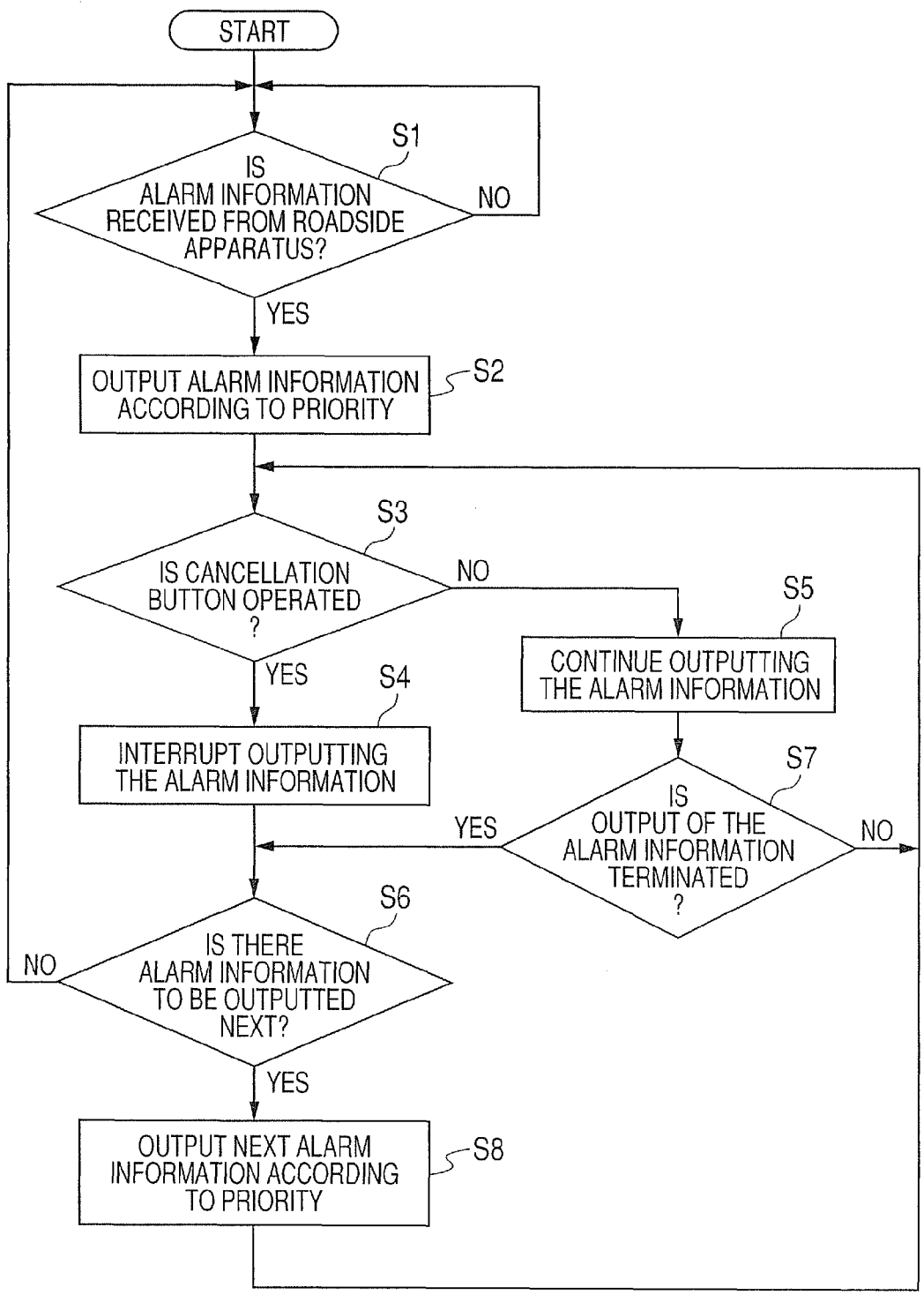
FIG. 6 shows an example of a processing procedure executed by the road traffic information providing system of FIG. 1 and is a flow chart for explaining an example of a processing procedure (operation) when a cancellation button is pushed down when the utterance type vehicle-mounted device receives alarm information from the roadside apparatus and outputs the information in utterance according to the priority of the information.

First, an operation of the utterance-type road traffic information providing device (system) when a cancellation button 401 is operated (pushed down) when the utterance type vehicle-mounted device 200 receives the alarm information from the roadside apparatus 100 and outputs the information in utterance according to the priority of the information will be described with reference to a flow chart of FIG. 6.

First, the control unit 207 of the utterance type vehicle-mounted device 200 determines whether the alarm information is received from the roadside apparatus 100 (step S1). If the reception is not confirmed, step S1 is executed again after a predetermined time. If the reception is detected, the process moves to step S2.

After the transition to step S2, the control unit 207 outputs the information in utterance according to the priority of the received information and moves the process to step S3.

After the transition to step S3, the control unit 207 determines whether an operation of the operation unit (push down of the cancellation button 401) is performed. If the control unit 207 determines that the operation is performed, the control unit 207 moves the process to step S4, interrupts (outputs an utterance output stop signal to the audio processing unit 202) outputting the alarm information (alarm information outputted in utterance when the operation unit is operated) in utterance, and moves the process to step S6.

After the transition to step S6, the control unit 207 determines whether there is alarm information to be outputted in utterance next. If the control unit 207 determines that there is no alarm information to be outputted in utterance next, the control unit 207 returns the process to step S1 and waits for the reception of the next alarm information from the roadside apparatus 100. On the other hand, if the control unit 207 determines that there is alarm information to be outputted in utterance next, the control unit 207 moves the process to step S8, outputs the alarm information next in the priority in utterance, and returns the process to step S3.

On the other hand, if the control unit 207 determines in step S3 that the operation of the operation unit is not performed, the control unit 207 moves the process to step S5, continues outputting the alarm information in utterance, and moves the process to step S7.

After the movement to step S7, the control unit 207 determines whether the utterance output of the alarm information is terminated. If the control unit 207 determines that the utterance output is terminated, the control unit 207 moves the process to step S6. If the control unit 207 determines that the utterance output is not terminated, the control unit 207 returns the process to step S3.

The control unit 207 continues the foregoing processes (steps S1 to S8) until the power of the utterance type vehicle-mounted device 200 is turned off. Although not particularly described, in cases such as when the output of the alarm information is interrupted (skipped) or when the output of the alarm information is completed without interruption, the alarm information stored in the storage unit 206 may be deleted as needed. The same applies hereinafter.

Figure 7:
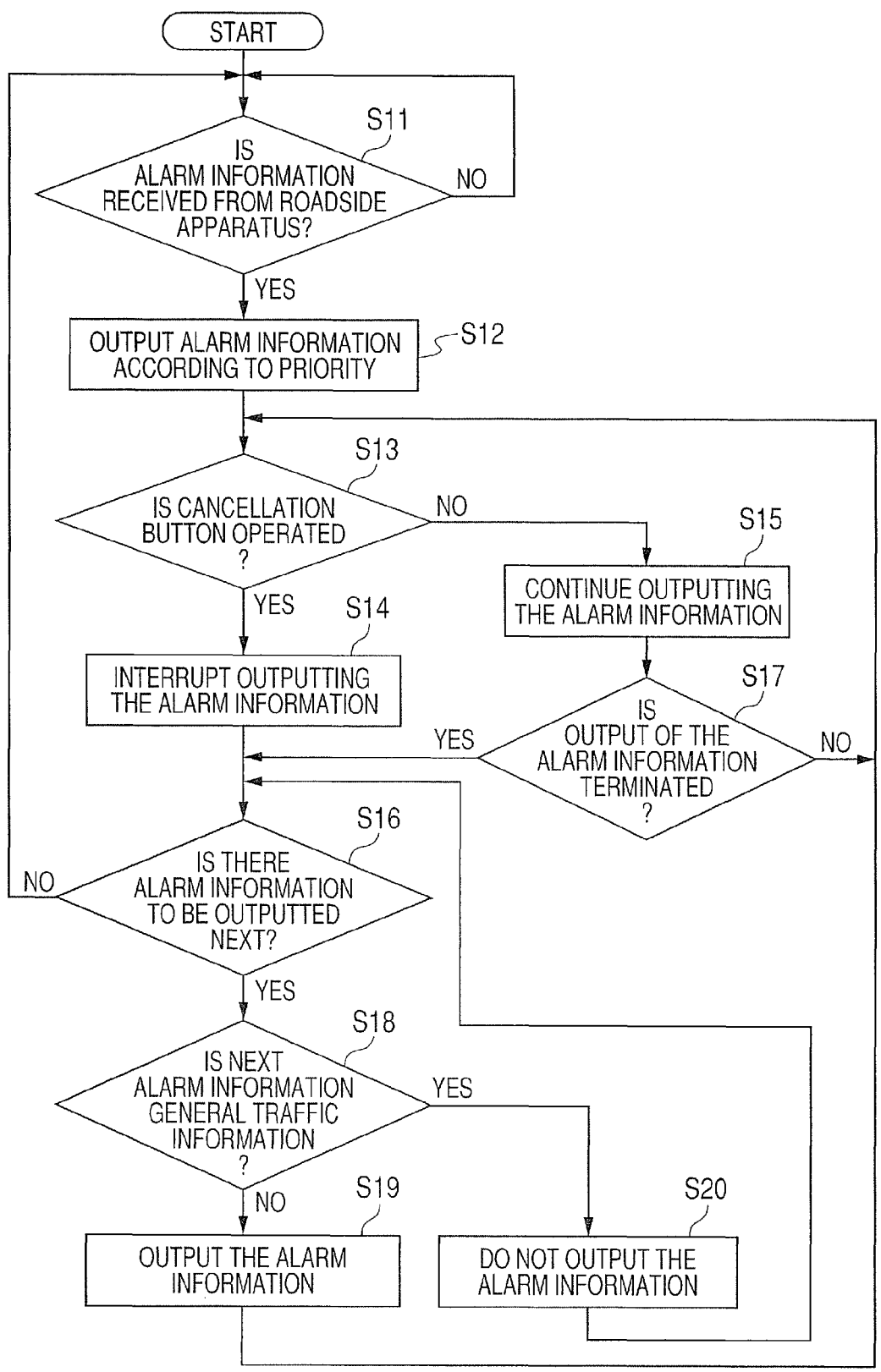
FIG. 7 shows another example of a processing procedure executed by the road traffic information providing system of FIG. 1 and is a flow chart for explaining an example of a processing procedure (operation) in which if a cancellation button is pushed down when the utterance type vehicle-mounted device outputs high-priority alarm information in utterance, general traffic information is not outputted in utterance thereafter.

Next, the utterance-type road traffic information providing device (system) that operates not to output the general traffic information in utterance afterwards if the operation of the operation button (push down of the cancellation button) is performed when the utterance type vehicle-mounted device 200 outputs high-priority alarm information (disaster information or safe driving support information) in utterance will be described with reference to a flow chart of FIG. 7. Processes of steps S11 to S17 in the flow chart of FIG. 7 are the same as the processes of steps S1 to S7 in the flow chart of FIG. 6, and the description will not be repeated.

If the control unit 207 determines in step S16 that there is alarm information to be outputted in utterance next, the control unit 207 determines in step S18 whether the alarm information (alarm information to be outputted in utterance next) is general traffic information. If the control unit 207 determines that the alarm information is not general traffic information, the control unit 207 moves the process to step S19, outputs the alarm information in utterance, and moves the process to step S13. On the other hand, if the control unit 207 determines in step S18 that the alarm information is general traffic information, the control unit 207 moves the process to step S20, discards the alarm information, and moves the process to step S16.

The control unit 207 continues the foregoing processes (steps S11 to S20) until the power of the utterance type vehicle-mounted device 200 is turned off.

Next, an operation of the utterance-type road traffic information providing device (system) in which when the cancellation button 401 is operated (pushed down) when the utterance type vehicle-mounted device 200 receives the alarm information from the roadside apparatus 100 and outputs the information in utterance according to the priority of the information, the alarm information is outputted in utterance without accepting the cancellation button if the alarm information is disaster information or safe driving support information, and the utterance is stopped if the alarm information is general traffic information will be described with reference to a flow chart of FIG. 8.

First, the control unit 207 of the utterance type vehicle-mounted device 200 determines whether the alarm information is received from the roadside apparatus 100 (step S30). If the reception is not confirmed, the control unit 207 executes step S30 again after a predetermined time. If the reception is detected, the control unit 207 moves the process to step S31.

After the transition to step S31, the control unit 207 starts outputting the information in utterance according to the priority of the received information and moves the process to step S32.

After the transition to step S32, the control unit 207 determines whether the operation of the operation unit 204 (push down of the cancellation button 401) is performed. If the control unit 207 determines that the operation is not performed, the control unit 207 moves the process to step S34, outputs the alarm information, and then moves the process to step S36. On the other hand, if the control unit 207 determines in step S32 that the operation is performed, the control unit 207 moves the process to step S33.

After the transition to step S33, the control unit 207 determines whether the alarm information (alarm information outputted in utterance when the operation unit 204 is operated) is general traffic information. If the control unit 207 determines that the alarm information is not general traffic information, the control unit 207 moves the process to step S34. If the control unit 207 determines that the alarm information is general traffic information, the control unit 207 moves the process to step S35.

After the transition to step S35, the control unit 207 interrupts outputting the alarm information (outputs an utterance output stop signal to the audio processing unit 202), and the process moves to step S36.

After the transition to step S36, the control unit 207 determines whether there is alarm information to be outputted in utterance next. If the control unit 207 determines that there is no alarm information to be outputted in utterance next, the control unit 207 returns the process to step S30 and waits for the reception of the next alarm information from the roadside apparatus 100. On the other hand, if the control unit 207 determines that there is alarm information to be outputted in utterance next, the control unit 207 moves the process to step S37, outputs the alarm information next in the priority in utterance, and returns the process to step S32.

The control unit 207 continues the foregoing processes (steps S30 to S37) until the power of the utterance type vehicle-mounted device 200 is turned off.

Although each embodiment of the present invention has been described above, the present invention is not limited to this. For example, instead of the short range communication, another communication system such as midrange communication may be adopted.

Furthermore, the termination (interruption or discard) of the utterance output by the cancellation button 401 may be performed only in the case of the general traffic information. More specifically, the utterance output of the disaster information and the safe driving support information may not be stopped when the cancellation button 401 is pushed down.

Furthermore, long-press, double-press (or another button is installed), and the like of the cancellation button 401 may be performed (operated) during the output (or during non-output) of the general traffic information to not to output the general traffic information in utterance in a predetermined route or during a predetermined time (period). Alternatively, not only the general traffic information, but also the alarm information during a predetermined time or from a predetermined number of roadside apparatuses 100 may not be outputted by the operation of the button. The disaster information may be surely outputted.

Furthermore, for example, in cases such as when a plurality of alarm information is transmitted (received) from the roadside apparatus 100, the next alarm information may be outputted in utterance (skipped and outputted) after pushing down of the cancellation button 401. In this case, the disaster information may not be able to be skipped. Alternatively, during the utterance output of the general traffic information (during reading out of a long sentence) or in other cases, the output utterance may be skipped to the next alarm information by pushing down the SKIP button 402 or the like if there is a next punctuation mark of TTS or a plurality of alarm information. As described, the SKIP button 402 is operation means having a function of interrupting the output of the alarm information being currently outputted in utterance to skip to the next alarm information, or a function of skipping to the next punctuation mark in the alarm information being currently outputted in utterance if the alarm information is constituted by long sentence TTS and including a punctuation mark.

Furthermore, if the cancellation button 401 is pushed down during the utterance output of high-priority alarm information, the following general traffic information (including information newly received from the roadside apparatus) may not be outputted.

Furthermore, the ID of the roadside apparatus 100 that has transmitted the alarm information outputted in utterance may be stored (registered) by the long-press, double-press, or the like of the cancellation button 401 or by pushing down another button or the like, and thereafter, the alarm information received from the roadside apparatus 100 with the registered ID may not be outputted in utterance (discarded, etc.). In this case, the disaster information may not be outputted in utterance. Alternatively, the ID of a roadside apparatus 100 in the lane opposite the vehicle or the ID of a roadside apparatus 100 received on a general road under an elevated expressway (roadside apparatus 100 that transmits alarm information not for the vehicle) may be registered, and thereafter, the alarm information received from the roadside apparatus 100 with the registered ID may not be outputted in utterance (discard, etc.). In this case too, the disaster information may be outputted in utterance.

Furthermore, in combination with an electronic compass, etc., TTS determined to be alarm information for vehicles in the lane opposite the vehicle may be configured not to be outputted in utterance. For example, if the alarm information received first is alarm information for the inbound lane, and the vehicle is in the inbound lane, the user does nothing but listens to the TTS. On the other hand, if the received alarm information is alarm information for the outbound lane, and the vehicle is in the inbound lane, the user pushes down a specific button of the cancellation button 401 or the like to terminate the utterance output, and thereafter, the determination of inbound/outbound is not changed until alarm information of a different route is received. As a result, only information for the correct direction (lane) can be outputted in utterance thereafter.

Furthermore, in a situation that inbound/outbound of lane frequently switches as in general roads, the route would be determined by information attached with the route number (Route ○, inbound/outbound), not only simply by inbound/outbound. In this case, the output utterance may be always performed first when the route number changes, and for example, the opposite lane may be set (determined) when the user pushes down a specific button of the cancellation button 401 or the like, and the forward lane may be set (determined) when the button is not pushed down.

Furthermore, although it is preferable to use the present embodiment in an apparatus (utterance type vehicle-mounted device 200) that cannot acquire the position information data or the direction data of the vehicle, the present embodiment can also be applied to an utterance type vehicle-mounted device connected to a portable-type simple navigation apparatus and the like and an ITS vehicle-mounted device connected to the navigation system (at least, vehicle-mounted device connected to a navigation apparatus that notifies the control unit 207 of the position information or the traveling direction information of the vehicle or incorporated into the navigation system). Although the DSRC system is used in the embodiments, another wireless system may be used. Furthermore, although the alarm information is alarmed according to the priority in the embodiments, the present invention can also be applied to information without the priority.

All or part of the functions of the configuration blocks included in the road traffic information providing system of the embodiment may be realized by software, or at least part of the functions may be realized by hardware. For example, all or part of the processes by the control units 104, 207, and 306 may be realized by one or a plurality of programs on a computer, or at least part of the processes may be realized by hardware.

Furthermore, the embodiment is only for explanation and does not limit the scope of the present invention. For example, a computer program for operating the utterance type vehicle-mounted device 200 as whole or part of the apparatus may be stored in a computer-readable recording medium, such as a memory card, a CD-ROM, a DVD, an MO (Magneto Optical Disk) for distribution, and the computer program may be installed on another computer, such as a portable phone, an audio device, and an electronic watch to cause the computer to operate the utterance type vehicle-mounted device 200 or to cause the computer to execute steps performed by the utterance type vehicle-mounted device 200. Furthermore, a program may be stored in a disk device or the like included in a server device on the Internet, and for example, the program may be downloaded to a computer serving as the utterance type vehicle-mounted device 200 by superimposing the program on a carrier wave.

The invention claimed is:

1. An utterance type road traffic information providing device which receives alarm information from a roadside apparatus installed on or near a road with a vehicle traveling or a parking lot through wireless communication and which outputs the alarm information, the road traffic information providing device comprising:

a communication unit configured to receive the alarm information from the roadside apparatus at timing at which a link is set up with the roadside apparatus;

a storage unit configured to temporarily store the alarm information;

an audio processing unit configured to convert the alarm information into audio information to output the audio information in utterance;

an operation unit configured to control the utterance output as needed; and alarm information transfer unit configured to read out the alarm information stored in the storage unit according to a priority to transfer the alarm information to the audio processing unit when an operation of the operation unit is not performed and for transferring a received utterance output stop signal and the alarm information to the audio processing unit under a predetermined condition according to the operation content when the operation of the operation unit is performed, wherein when the utterance output stop signal is transferred by the alarm information transfer unit, an output is conducted in accordance with the priority of the alarm information or stored alarm information succeeding the alarm information whose utterance is intended to be stopped.

2. The road traffic information providing device according to claim 1, wherein when a predetermined operation is performed by the operation unit, the alarm information transfer unit transfers the utterance output stop signal to the audio processing unit and does not transfer alarm information excluding disaster information as one of the alarm information stored in the storage unit to the audio processing unit for a predetermined time or for a predetermined number of pieces.

3. The road traffic information providing device according to claim 1, wherein when a predetermined operation is performed by the operation unit, the alarm information transfer unit transfers the utterance output stop signal to the audio processing unit, further interrupts transferring the alarm information being transferred and stored in the storage unit, skips the transfer position of the interrupted alarm information to a next punctuation mark of Text To Speech (TTS) or to next alarm information, and then resumes transferring the alarm information to the audio processing unit from the skipped transfer position.

4. The road traffic information providing device according to claim 1, wherein if a predetermined operation is performed by the operation unit when the alarm information transfer means transfers high-priority alarm information, the alarm information transfer unit transfers the utterance output stop signal to the audio processing unit and does not transfer low-priority general traffic information as one of the alarm information stored in the storage unit subsequent to the high-priority alarm information.

5. The road traffic information providing device according to claim 1, further comprising an ID storage unit configured to store an ID of the roadside apparatus; and ID registration unit configured to register the ID of a predetermined roadside apparatus to the ID storage unit, wherein if a predetermined operation is performed by the operation unit when alarm information received from the roadside apparatus and not related to the vehicle is outputted in utterance, the ID registration unit registers the ID of the roadside apparatus to the ID storage unit, and the alarm information transfer unit does not transfer, to the audio processing unit, alarm information received from the roadside apparatus with the ID registered in the ID storage unit after the registration in the ID storage unit.

6. A method for providing road traffic information for receiving, by a road traffic information providing device, alarm information from a roadside apparatus installed on or near a road with a vehicle traveling or a parking lot through wireless communication and of outputting the alarm information, the method comprising the steps of:
- communicating to receive the alarm information from the roadside apparatus at timing at which a link is set up between the road traffic information providing device and the roadside apparatus;
- temporarily storing the alarm information;
- converting the alarm information into audio information to output the audio information in utterance;
- controlling the utterance output as needed; and
- transferring the alarm information by reading out the stored alarm information according to a priority of the alarm information to output the alarm information in utterance when an operation is not performed and outputting a received utterance output stop signal and the alarm information in utterance under a predetermined condition according to the operation content when the operation is performed,
- wherein when the utterance output stop signal is transferred in the alarm information transferring step, an output is conducted in accordance with the priority of the alarm information or stored alarm information succeeding the alarm information whose utterance is intended to be stopped.

7. A program causing a computer to function as:
- a communication unit configured to receive alarm information from a roadside apparatus at timing at which a link is set up between a road traffic information providing device and the roadside apparatus;
- a storage unit configured to temporarily store the alarm information;
- an audio processing unit configured to convert the alarm information into audio information to output the audio information in utterance;
- an operation unit configured to control the utterance output as needed; and
- alarm information transfer unit configured to read out the alarm information stored in the storage unit according to a priority of the alarm information to output the alarm information to the audio processing unit when an operation of the operation unit is not performed and for transferring a received utterance output stop signal to the audio processing unit under a predetermined condition according to the operation content and further transferring the alarm information to the audio processing unit when the operation of the operation unit is performed,
- wherein when the utterance output stop signal is transferred by the alarm information transfer unit, an output is conducted in accordance with the priority of the alarm information or stored alarm information succeeding the alarm information whose utterance is intended to be stopped.

* * * * *